United States Patent
Kahalon et al.

(10) Patent No.: US 10,637,828 B2
(45) Date of Patent: Apr. 28, 2020

(54) NIC WITH STATEFUL CONNECTION TRACKING

(71) Applicant: Mellanox Technologies, Ltd., Yokneam (IL)

(72) Inventors: Omri Kahalon, Yehud (IL); Lior Narkis, Petah Tikva (IL); Muhamad Grefat, Zarzir (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 134 days.

(21) Appl. No.: 15/706,713

(22) Filed: Sep. 17, 2017

(65) Prior Publication Data

US 2019/0089679 A1    Mar. 21, 2019

(51) Int. Cl.
*H04L 29/06* (2006.01)
*H04L 12/813* (2013.01)
*G06F 9/455* (2018.01)

(52) U.S. Cl.
CPC .......... *H04L 63/0254* (2013.01); *H04L 47/20* (2013.01); *H04L 63/0263* (2013.01); *G06F 9/455* (2013.01); *G06F 9/45558* (2013.01); *G06F 2009/45595* (2013.01); *H04L 63/1458* (2013.01); *H04L 69/22* (2013.01)

(58) Field of Classification Search
CPC .......... H04L 63/0254; H04L 47/2441; H04L 47/2483; H04L 69/22; H04L 43/02
See application file for complete search history.

(56) References Cited

U.S. PATENT DOCUMENTS

| 7,177,941 | B2 | 2/2007 | Biran et al. |
| 7,577,758 | B2 | 8/2009 | Ricciulli |
| 7,660,306 | B1 * | 2/2010 | Eiriksson ............ H04L 12/4641 370/392 |
| 2002/0116644 | A1 * | 8/2002 | Richard .................. H04L 63/02 726/9 |

(Continued)

OTHER PUBLICATIONS

Kaufmann et al. High Performance Packet Processing with FlexNIC Apr. 2-6, 2016 ASPLOS '16 (Year: 2016).*

(Continued)

*Primary Examiner* — David J Pearson
(74) *Attorney, Agent, or Firm* — Kligler & Associates Patent Attorneys Ltd (57) ABSTRACT

Network interface apparatus includes packet processing circuitry, comprising hardware logic coupled between a network interface and a host interface for connection to a host processor. The hardware logic accesses a list of active connections established between the local processes running on the host processor and corresponding processes on other computers on the network and maintains context information with respect to each of the active connections. Upon receiving a packet from the network having a header identifying the packet as having been transmitted to a local process in accordance with a predefined transport protocol, the hardware logic checks the list to find a connection to which the packet belongs and upon finding the connection, verifies that the packet conforms to the respective state indicated by the context information for the connection and, if so, updates the context information and passes the packet to the local process.

22 Claims, 4 Drawing Sheets

(56) References Cited

U.S. PATENT DOCUMENTS

| | | | |
|---|---|---|---|
| 2004/0042458 A1* | 3/2004 | Elzu | H04L 12/2856 370/394 |
| 2004/0042483 A1* | 3/2004 | Elzur | H04L 29/06 370/463 |
| 2006/0274742 A1* | 12/2006 | Pong | H04L 45/7453 370/389 |
| 2008/0115204 A1* | 5/2008 | Ramsey | H04L 63/0218 726/13 |
| 2013/0061313 A1 | 3/2013 | Cullimore et al. | |
| 2013/0254766 A1* | 9/2013 | Zuo | H04L 47/20 718/1 |
| 2013/0315237 A1* | 11/2013 | Kagan | H04L 69/321 370/389 |
| 2014/0003441 A1* | 1/2014 | Shachar | H04L 5/0055 370/401 |
| 2014/0059216 A1 | 2/2014 | Jerrim | |
| 2014/0089450 A1* | 3/2014 | Raindel | G06F 3/061 709/213 |
| 2015/0358290 A1 | 12/2015 | Jain et al. | |
| 2016/0036856 A1 | 2/2016 | Liu et al. | |
| 2016/0050299 A1 | 2/2016 | Huang et al. | |

OTHER PUBLICATIONS

PCI Express® Base Specification, Revision 3.0, 860 pages, Nov. 10, 2010.
Request for Comments 793, "Transmission Control Protocol", DARPA Internet Program, Protocol Specification, 90 pages, Sep. 1981.
Handley et al., "TCP Congestion Window Validation", Network Working Group, RFC2861, 11 pages, Jun. 2000.
U.S. Appl. No. 15/996,548 office action dated Apr. 29, 2019.

* cited by examiner

NIC WITH STATEFUL CONNECTION TRACKING

FIELD OF THE INVENTION

The present invention relates generally to data communications, and specifically to apparatus and methods for filtering data packets received from a network.

BACKGROUND

A network interface controller (NIC) is a device that manages and transfers communications between a host computer (referred to alternatively simply as a "host") and a network, such as a local area network or switch fabric. The NIC directs packets from the network to their destination in the computer, for example by placing the packets in a buffer of a destination application in the computer memory, and directs outgoing packets to the network.

Some NICs are capable of filtering packets received from the network, and can thus perform access control and firewall functions on behalf of the host computer. For example, U.S. Patent Application Publication 2015/0358290 describes a method for stateful packet classification that uses hardware resources for performing stateful connection flow handshaking. To classify an incoming packet from a network, some embodiments perform stateless look-up operations for the incoming packet in hardware and forward the result of the stateless look-up to the software. The software in turn uses the result of the stateless look-up to perform the stateful connection flow handshaking and to determine the result of the stateful packet classification.

SUMMARY

Embodiments of the present invention that are described hereinbelow provide improved network interface devices and methods for processing packets received by a host computer from a network.

There is therefore provided, in accordance with an embodiment of the invention, network interface apparatus, including a host interface for connection to a host processor, and a network interface, which is configured to receive over a network incoming data packets destined for one or more local processes running on the host processor. Packet processing circuitry includes hardware logic, which is coupled between the network interface and the host interface and is configured to access a list of active connections established between the local processes running on the host processor and corresponding processes on other computers on the network in accordance with a predefined transport protocol and to maintain context information with respect to a respective state of each of the active connections. The hardware logic is configured, upon receiving a packet from the network having a header identifying the packet as having been transmitted to a local process in accordance with the predefined transport protocol, to check the list to find a connection to which the packet belongs and upon finding the connection, to verify that the packet conforms to the respective state indicated by the context information for the connection and, if so, to update the context information and pass the packet to the local process.

In some embodiments, the hardware logic is configured, when the connection is not found on the list, to pass the packet to a privileged software process running on the host processor for handling by the privileged software process. Typically, the privileged software process is configured to establish a new connection in response to the packet, whereupon the new connection is added to the list and the context information maintained by the hardware logic for use by the hardware logic in handling subsequent packets received from the network on the new connection.

Additionally or alternatively, the hardware logic is configured, when the packet does not conform to the respective state of the connection to which the packet belongs, to identify the packet as invalid, wherein invalid packets are not passed to the local process. Typically, the hardware logic is configured to pass the invalid packet to a privileged software process running on the host processor for handling by the privileged software process.

In a disclosed embodiment, the hardware logic is further configured to monitor outgoing data packets transmitted to the network by the local processes over the active connections and to update the context information for the active connections responsively to the transmitted data packets.

In some embodiments, the predefined transport protocol includes a Transmission Control Protocol (TCP). Typically, the context information includes a state machine maintained for each of the active connections. Additionally or alternatively, the context information includes a TCP connection window, wherein the hardware logic is configured to check that a sequence number of the packet falls within the TCP connection window and to update the TCP connection window responsively to the sequence number of the packet.

In one embodiment, when the local process is running on a virtual machine running over a virtual machine monitor on the host processor, the hardware logic is configured, upon verifying that the packet conforms to the respective state, to pass the packet to the local process on the virtual machine while bypassing the virtual machine monitor.

There is also provided, in accordance with an embodiment of the invention, a method for communication, which includes receiving over a network in a network interface controller (NIC) incoming data packets destined for one or more local processes running on a host processor that is coupled to the network by the NIC. A list is maintained of active connections established via the NIC between the local processes running on the host processor and corresponding processes on other computers on the network in accordance with a predefined transport protocol, and context information is maintained with respect to a respective state of each of the active connections. Upon receiving in the NIC a packet from the network having a header identifying the packet as having been transmitted to a local process in accordance with the predefined transport protocol, the NIC checks the list to find a connection to which the packet belongs. Upon finding the connection, the NIC verifies that the packet conforms to the respective state indicated by the context information for the connection and, if so, updates the context information and passes the packet to the local process.

The present invention will be more fully understood from the following detailed description of the embodiments thereof, taken together with the drawings in which:

DETAILED DESCRIPTION OF EMBODIMENTS

Filtering of incoming packets received from a network is crucial in maintaining security against attacks. Stateless filtering—in which packets are simply checked against certain valid and invalid patterns of header and payload content—is useful as a first line of defense, but has been found to provide insufficient protection against more sophisticated types of attacks, such as distributed denial of service (DDoS) attacks and probes used by persistent attackers. Attacks of these sorts take advantage of connections made using stateful transport protocols, such as the Transmission Control Protocol (TCP). Stateful filtering, based on monitoring the states of connections and rejecting packets that do not conform to the state parameters expected of legitimate traffic, is therefore an important tool in mitigating possible damage due to such attacks.

Stateful connection monitoring and filtering involve complex decision logic and are therefore generally carried out in software, for example using the Connection Tracking software module of the Linux operating system kernel. In a server handling large volumes of TCP or other connection-oriented traffic, this sort of connection tracking imposes a heavy burden on the central processing unit (CPU), which must check and update context information for every packet that is received or transmitted over many different connections concurrently. This processing load can also have a serious negative impact on message throughput and latency.

Embodiments of the present invention that are described herein address these limitations by offloading at least a portion of these connection tracking and filtering functions to hardware logic in the NIC that is used to connect the host computer to a network. Because of the complexities of connection-oriented transport protocols, such as TCP, it is generally not practical to offload all the control flows of connection tracking to hardware logic. The large majority of connection-oriented traffic, however, is made up of legitimate message flows over existing connections. Therefore, in the disclosed embodiments, connection set-up and termination are still carried out in software, typically by a privileged process in or connected with the kernel of the host operating system. At the same time, hardware logic in the NIC performs stateful filtering and context updates for existing connections, while passing exceptions to the software for handling.

In the embodiments that are described hereinbelow, network interface apparatus, such as a NIC, comprises a host interface for connection to a host processor and a network interface, which receives incoming data packets from a network that are destined for local processes running on the host processor. (The local process to which an incoming packet is destined, as indicated by the address information in the packet header, is also referred to herein as the destination process.) In order to handle the incoming packets that belong to a certain connection-oriented transport protocol (or protocols), such as TCP, hardware logic in the NIC accesses a list of active connections that have been established between the local processes running on the host processor and corresponding processes on other computers in accordance with the protocol. The hardware logic also maintains context information with respect to the respective state of each of the active connections, and updates this context information based on the incoming and outgoing packets handled by the NIC.

Upon receiving a packet from the network having a header identifying the packet as having been transmitted to a local process in accordance with the protocol that is being monitored, the hardware logic checks the list of active connections to find the connection to which the packet belongs. Upon finding the connection, the hardware logic verifies that the packet conforms to the state indicated by the context information for this connection. If it does conform, the hardware logic updates the context information while passing the packet to the local process. Packets can be passed in this manner to and from non-privileged, user-level application software, including applications running on virtual machines running on the host computer, without involvement by the host operating system kernel or other privileged software. The hardware may also monitor outgoing packets on the active connections in order to update the context information as required.

Typically, the hardware logic in the NIC passes the packet to the target local process indicated by the packet header only when the packet conforms as expected to the state of an existing connection on the list. When the connection is not found on the list, or the packet does not conform to the state of the connection to which the packet belongs, the hardware logic applies other processing rules. For example, the hardware logic can pass the packet to a privileged software process running on the host processor for the purpose of possibly establishing a new connection or tearing down an existing connection. When such a new connection is established by software, it is added to the list and to the context information maintained by the hardware logic for use in handling subsequent packets. In other cases, the hardware logic may identify the packet as invalid, and discard the packet or pass it to a privileged software process for special handling.

For the sake of concreteness and clarity or illustration, the embodiments that are described herein relate specifically to filtering of TCP traffic. The techniques described herein are similarly applicable, mutatis mutandis, to other connection-oriented transport protocols, such as the Stream Control Transmission Protocol (SCTP) and the File Transfer Protocol (FTP), as well as to connection tracking with respect to stateless protocols, such as the User Datagram Protocol (UDP). Furthermore, the principles of hardware-based connection tracking that are described herein may also be applied in stateful packet handling for other purposes, such as offload to a NIC of functions associated with network address translation (NAT). All such alternative implementations and applications are considered to be within the scope of the present invention.

Figure 1:
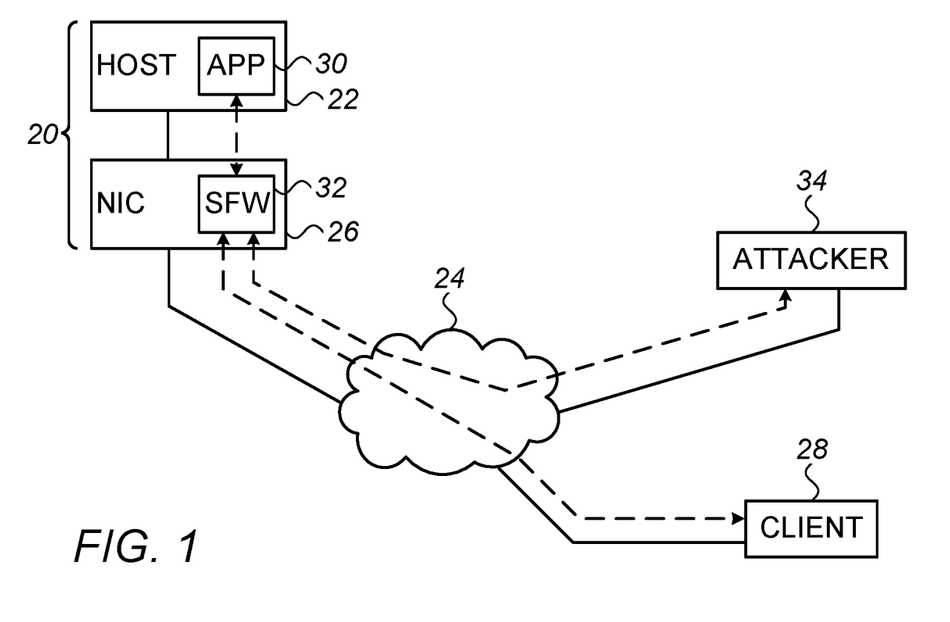
FIG. 1 is block diagram that schematically illustrates the operation of a server with a NIC that performs stateful firewall functions, in accordance with an embodiment of the invention.

FIG. 1 is block diagram that schematically illustrates the operation of a server 20 with a NIC 26 that functions as a stateful firewall (SFW) 32, in accordance with an embodiment of the invention. Server 20 comprises a host complex 22, which is connected by NIC 26 to a packet data network 24, such as an Internet Protocol (IP) network. Processes running on other computers on network 24, such as a client process 28, interact with processes running on server 20, such as an application 30, by opening and using TCP connections through the network. The principles and requirements of TCP in this regard are described, for example, in Request for Comments (RFC) 793 of the Internet Engineering Task Force (IETF).

Stateful firewall 32 comprises hardware logic, as described further hereinbelow, which is integrated as a part of the packet processing logic of NIC 26 and is configured to track TCP connections that are in use by host complex 22, such as the connection between client process 28 and application 30 shown in FIG. 1. Once this TCP connection has been set up, stateful firewall 32 tracks and updates the state of the connection based on the packets that are transmitted and received via the connection over network 24. On this basis, NIC 26 is able to filter incoming TCP packets from client process 28, to verify that they conform to the expected state, and if so, to update the context information while passing the packet to application 30.

Stateful firewall 32 in NIC 26 will similarly filter TCP packets transmitted to server 20 by malicious entities, such as an attacker 34. The attacker may, for example, attempt to bombard server 20 with requests to open TCP connections, as in a DDoS attack, or may attempt to send malformed or otherwise non-standard TCP packets over a connection to server 20 in order to exploit a software vulnerability of host complex 22. In such cases, stateful firewall 32 will encounter incoming TCP packets that do not conform to the expected state of an existing connection. NIC 26 will not pass such packets to application 30 (or to other non-privileged processes), but will rather queue them for handling by a privileged software process running on host complex 22. In the meanwhile, because the functions of stateful firewall 32 are performed by hardware logic, NIC 26 will continue passing legitimate incoming TCP packets that have been received on existing connections to application 30 without significant delay or reduction of bandwidth, even under attack conditions.

The functions performed by firewall 32, as described herein, are "stateful" in the sense that their implementation requires NIC 26 to track and make use of the respective states of the packet flows involved. Thus, depending on the states of the various connections that firewall 32 monitors, NIC 26 may find a given set of header parameters in a certain packet to be legitimate at a given time, and thus will pass the packet through to its destination process. NIC 26 may reject a later packet with the same set of parameters because it does not conform to the current connection state. In addition to the novel stateful, hardware-based filtering functions that are described herein, NIC 26 may also carry out stateless filtering functions that are known in the art, such as application of predefined access control rules.

Figure 2:
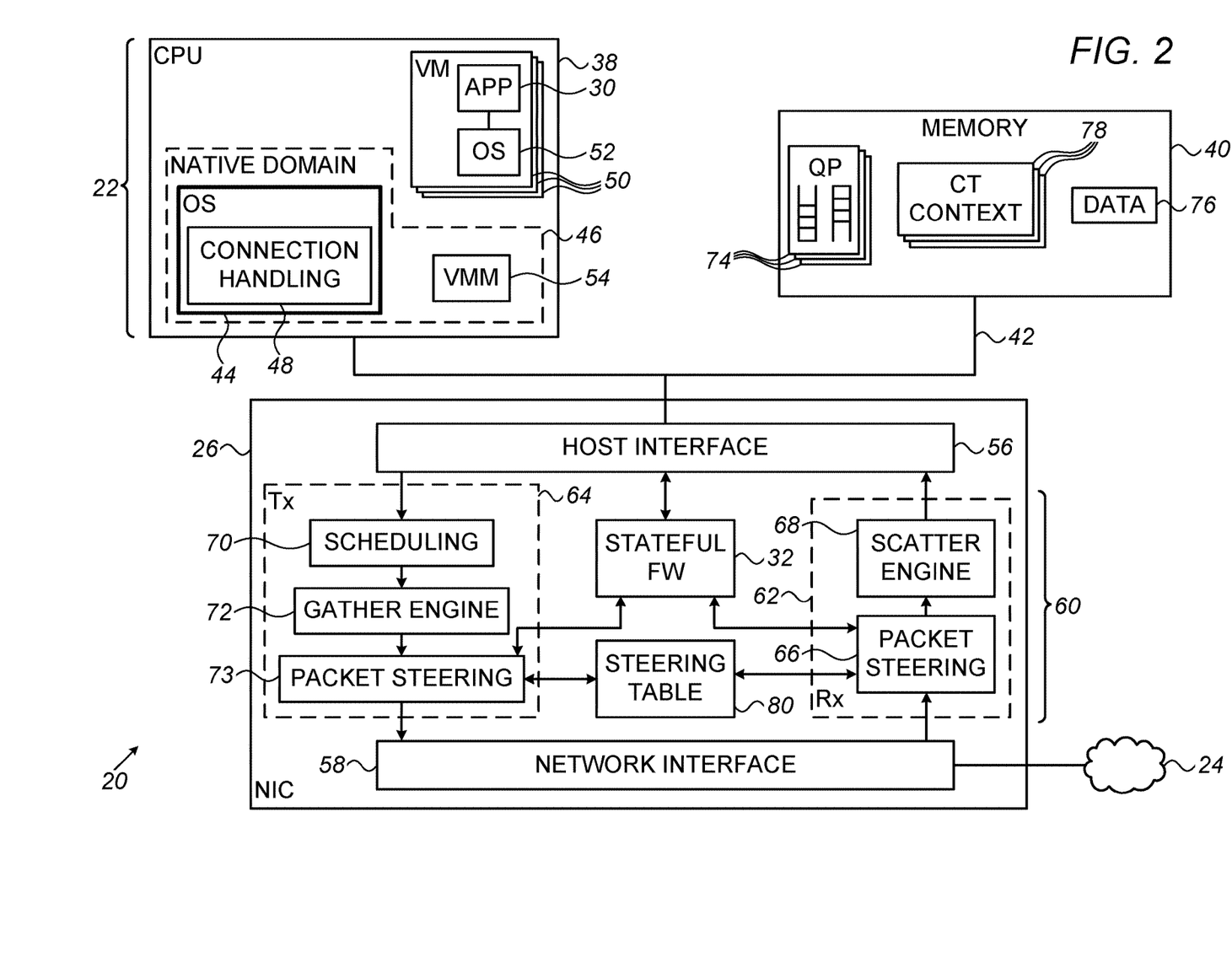
FIG. 2 is a block diagram showing details of a server and a NIC implementing a stateful firewall, in accordance with an embodiment of the invention.

FIG. 2 is a block diagram showing details of server 20, and specifically of NIC 26 and stateful firewall 32, in accordance with an embodiment of the invention. For the sake of brevity, only those aspects of host complex 22 and NIC 26 that are necessary to an understanding of the present embodiments are shown in the figure and described hereinbelow. Other features of the construction and operation of server 20, as well as the integration of these features with those described herein, will be apparent to those skilled in the art. Typically, NIC 26 comprises one or more integrated circuit chips, in which the functional components that are shown in FIG. 2, along with other, standard elements, are implemented in hardware logic, which may be hard-wired or programmable. Additionally or alternatively, certain elements of NIC 26 may be implemented in software or firmware running on an embedded processor.

Host complex 22 comprises a host processor in the form of a central processing unit (CPU) 38, with a memory 40, typically comprising random-access memory (RAM). NIC 26 is connected to CPU 38 and memory 40 via a bus 42, such as a Peripheral Component Interconnect Express® (PCIe®) bus, as is known in the art. In the pictured example, server 20 supports a virtual machine environment, in which one or more virtual machines 50 run on CPU 38. The software running on CPU 38, including both operating system and application programs, may be downloaded to server 20 in electronic form, over a network for example. Additionally or alternatively, the software may be stored on tangible, non-transitory computer-readable media, such as optical, magnetic or electronic memory media, which may be embodied in memory 40.

CPU 38 operates a native domain 46, with a host operating system 44, which can support host user applications and other native processes. These processes include a privileged TCP connection handling module 48, which may be a part of the kernel of operating system 44. Module 48 is "privileged" in that it has access to and is able to make changes in the state context of TCP connections established over network 24. This context includes parameters that are used in setting up and maintaining TCP connections, such as the current state, packet sequence numbers, and window values. Other privileged software modules running on CPU 38 include a virtual machine monitor (VMM) 54, also referred to as a "hypervisor."

In addition to these native domain functions, CPU 38 concurrently runs one or more virtual machines 50, as noted above, each with its own guest operating system 52 and guest user applications, such as application 30. VMM 54 in native domain 46 interacts with the kernels of guest operating systems 52 of virtual machines 50 in a manner that emulates the host processor and allows the virtual machines to share the resources of CPU 38. A wide range of virtual machine software of this sort is available commercially, and further description is beyond the scope of the present disclosure.

NIC 26 comprises a host interface 56, for connection to CPU 38 and memory 40 via bus 42, and a network interface 58, comprising one or more ports connected to network 24. Network interface 58 transmits and receives data packets in multiple packet flows from and to processes running on CPU 38. The packets are processed by packet processing circuitry 60, which is coupled between host interface 56 and network interface 58 and comprises a receive (Rx) pipe 62, for processing incoming data packets received from network 24, and a transmit (Tx) pipe 64, for processing outgoing packets for transmission to the network.

In received pipe 62, packet steering logic 66 identifies, for each incoming packet, the flow to which the packet belongs and the local process running on CPU 38 to which the packet is to be delivered. In order to make this decision, steering logic 66 extracts a flow identifier from the packet, typically based on one or more packet header fields, such as the IP 5-tuple (source and destination addresses, source and destination ports, and protocol identifier) and/or a transport-layer value. Steering logic looks up the flow in a steering table 80, which also indicates whether the packet is to be referred to stateful firewall 32 before forwarding to the destination process. If so, firewall 32 filters the packet and then may indicate to steering logic 66 the destination process to which the packet should be directed. For example, firewall 32 may indicate to steering logic 66 whether to forward the packet to application 30 or to connection handling module 48. Steering logic 66 then directs a scatter engine 68 in receive pipe 62 to write the packet to an appropriate data buffer 76 in memory 40, typically by direct memory access (DMA) over bus 42. Receive pipe 62 notifies the destination process that the packet is available for reading, for example by placing a completion report in a completion queue in memory 40.

In transmit pipe 64, scheduling logic 70 arbitrates among packet transmission requests submitted by processes running on CPU 38. When scheduling logic 70 has scheduled a packet for transmission, a gather engine 72 reads the packet data from memory 40 and passes the packet to packet steering logic 73, which passes information to stateful firewall 32 regarding outgoing TCP packets that have been queued for transmission. This information enables firewall 32 to update the state context of existing TCP connections and to return corresponding state information to steering logic 73. On this basis, steering logic 73 makes the appropriate steering decision, for example to pass the packet to network interface 58 for transmission over network 24.

Processes running on CPU 38, such as user application 30 and connection handling module 48, interact with NIC 26 by manipulating a transport service instance, known as a "queue pair" (QP) 74. To send and receive messages over network 24 using NIC 26, processes running on CPU 38 submit work items, called work queue elements (WQEs), to the appropriate queues for execution by the NIC. In a model that is known as single-root I/O virtualization (SR-IOV), each virtual machine 50 interacts with NIC 26 in this manner as though the NIC was dedicated to that virtual machine, linking the virtual machine to other machines (virtual and/or physical) on network 24. NIC 26 thus appears to each virtual machine 50 to be a dedicated I/O device, or vNIC, for use by that virtual machine in communicating directly over the network. This configuration minimizes the burden of communication on VMM 54 and on host operating system 44.

When connection handling module 48 establishes a new TCP connection over network 24, it opens a connection-tracking (CT) context 78 in memory 40 and notifies packet steering logic 66 and stateful firewall 32 of the connection. Portions of context 78 may also be cached in a dedicated memory (not shown) in NIC 26 for rapid access by firewall 32. Context 78 contains information to be used and updated by firewall 32 in connection tracking and packet filtering, as well as by connection handling module 48 in handling exceptions detected by firewall 32. When a connection is terminated by the participating processes, connection handling module 48 typically deletes the corresponding context from memory 40.

The information held in CT context 78 for each TCP connection can include, for example:

Header fields (such as source and destination addresses and ports) of incoming and outgoing data packets on the connection.
Connection state (for example, TCP SYN packet sent or received, ACK packet sent or received, FIN packet sent or received, or connection reset in progress).
TCP data sequence number (SN) and length of last TCP packet sent or received and corresponding TCP acknowledgment.
Acknowledgment (ACK) sequence number. (References to checking of TCP sequence numbers in the description that follows and in the claims include, as appropriate, either or both of the data and acknowledgment sequence numbers.)
Current TCP window size information.
Connection performance data, such as the number and status of packet retransmissions.
Control parameters, for example setting thresholds for protocol faults (such as window tracking deviations) at which firewall 32 should block packet reception and report an exception, and types of exceptions that the firewall should report to software.

The above context parameters are listed by way of example, and details and variations on the above will be apparent to those skilled in the art after reading the present description.

Figure 3:
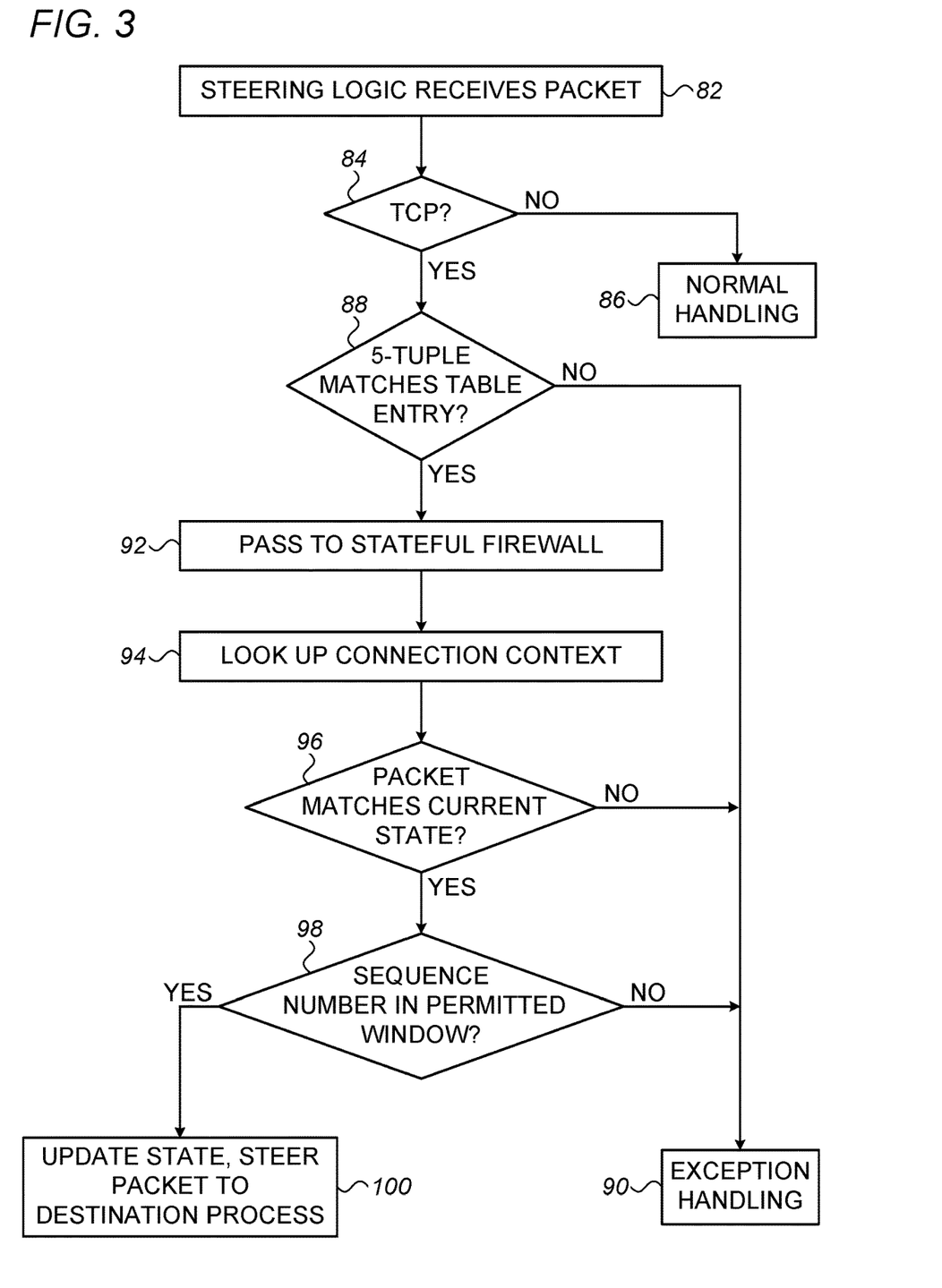
FIG. 3 is a flow chart that schematically illustrates a method for handling packets received from a network in a NIC, in accordance with an embodiment of the invention.

FIG. 3 is a flow chart that schematically illustrates a method for handling packets received from a network in NIC 26, in accordance with an embodiment of the invention. The method is initiated by packet steering logic 66 upon receiving an incoming packet from network 24, at a packet input step 82. Steering logic 66 checks the protocol field in the packet header in order to determine whether it is a TCP packet, at a protocol detection step 84. If not, processing of the packet by NIC 26 proceeds in the usual stateless fashion, at a normal handling step 86. This step may include packet filtering by firewall 32, but these stateless modes of filtering are outside the scope of the present description.

If the protocol field identifies the packet as a TCP packet at step 84, packet steering logic 66 checks the packet header against the list of existing TCP connections in steering table 80, at a connection checking step 88. For this purpose, packet steering logic 66 can check the IP 5-tuple against the entries in table 80, for example using a hash-based lookup over the 5-tuple fields.

If the packet does not match any of the connections listed in table 80, steering logic 66 passes the packet to a privileged software process running on CPU 38, such as connection handling module 48, at an exception handling step 90. For this purpose, steering logic 66 can use a QP 74 (FIG. 2) that is dedicated to the privileged software process. Specifically, steering logic 66 reads a WQE from the receive queue of the QP and instructs scatter engine 68 to write the packet to a data buffer 76 indicated by the WQE.

The action taken at step 90 by connection handling module 48 depends upon the type of exception that has been encountered, and NIC 26 may signal different exception types to indicate to connection handling module 48 what sort of action is required. One exception type could be, for example, a TCP SYN packet received from network 24, such as a TCP SYN packet sent by client process 28 (FIG. 1) in order to initiate a communication session with application 30 on server 20. In this case, connection handling module 48 will establish a new connection in response to the packet, and will add the new connection to the list in steering table 80. Connection handling module will also open a new CT context 78 in memory 40 for use by the hardware logic in handling subsequent packets received from client process 28 on the new connection.

Figure 4:
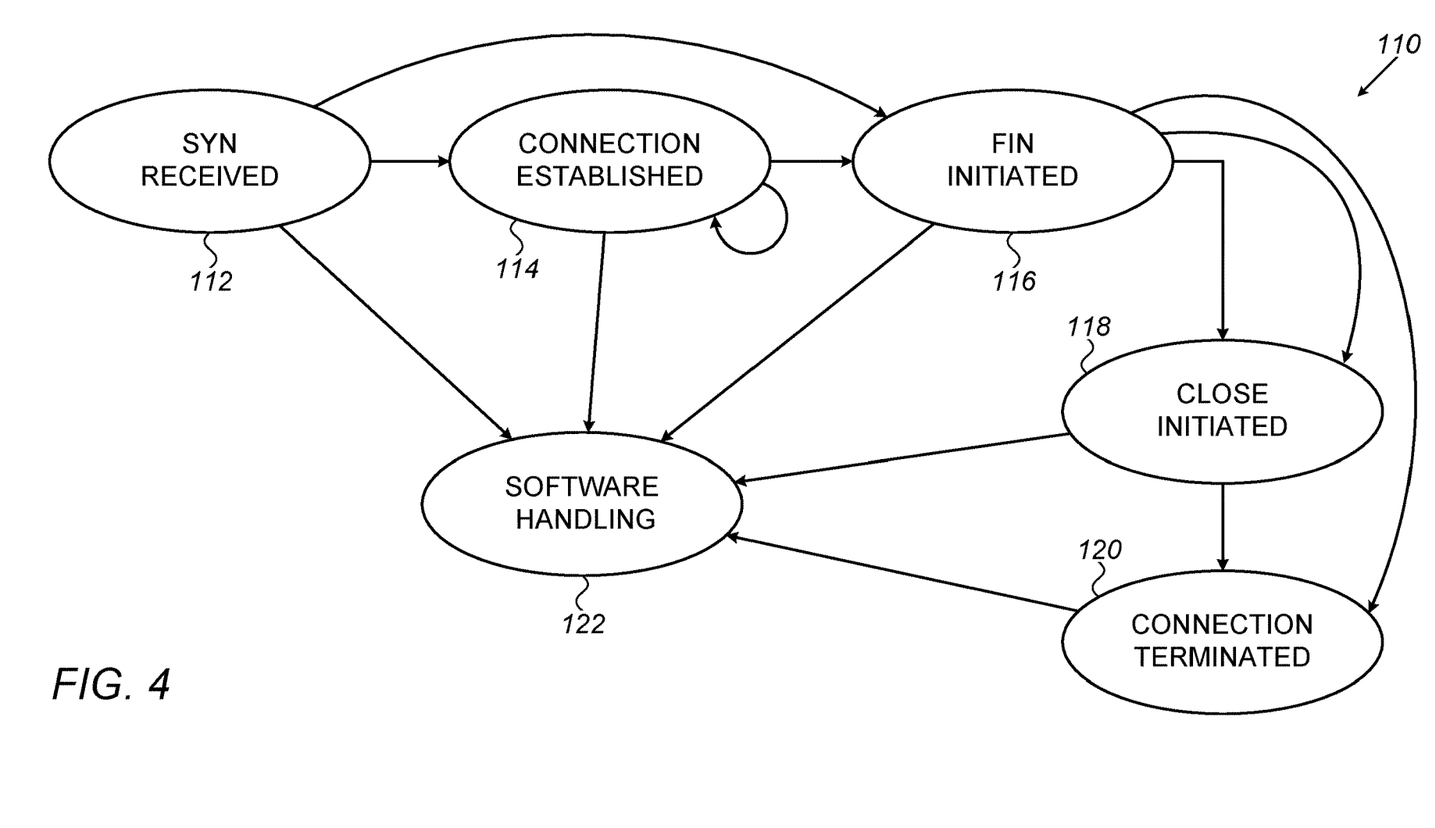
FIG. 4 is a state diagram that schematically illustrates a method for connection tracking by a NIC, in accordance with an embodiment of the invention.

When packet steering logic 66 finds at step 88 that the header of the current packet does match an entry listed in steering table 80, it passes the packet to stateful firewall 32, at a firewall invocation step 92. Stateful firewall 32 looks up the appropriate CT context 78 for the packet, either in memory 40 or in an on-board cache, at a context lookup step 96. The stateful firewall then checks whether the packet conforms to the current state of the connection, at a state checking step 96. A state machine model that can be used for this purpose is shown in FIG. 4.

When the packet does not conform to the current state of the connection to which the packet belongs, stateful firewall 32 marks the packet as invalid, and passes the packet to connection handling module 48 (or to another privileged software process that is designated for the purpose), at exception handling step 90. For security reasons, such invalid packets are not passed to the purported destination process of the connection (such as application 30), and their processing in software may be subject to measures intended to detect and mitigate attacks on server 20. In addition, stateful firewall 32 may also pass packets used in setting up and tearing down TCP connections (as opposed to packets carrying messages over an existing connection) to connection handling module 48 at this step.

When stateful firewall 32 finds at step 96 that the current state of the packet is valid and is not associated with connection set-up or tear-down, it checks the TCP sequence number against the current TCP window parameters held for this connection in CT context 78, at a window checking step 98. Specifically, stateful firewall 32 checks that the sequence number of the packet falls within the TCP connection window, in accordance with standard TCP requirements. If not, stateful firewall 32 again treats the packet as invalid and passes it on for handling by privileged software at step 90.

Only when a TCP packet has passed all of the above tests does stateful firewall 32 return the packet to steering logic 66 with clearance to pass the packet to the destination process, such as application 30, at a packet delivery step 100. Stateful firewall 32 will also update the relevant state parameters in CT context 78, including an update of the TCP connection window based on the sequence number of the packet. In a virtualized environment offering SR-IOV functionality, such as that shown in FIG. 2, steering logic 66 can instruct scatter engine 68 to pass the packet directly to application 30 running on virtual machine 50, while bypassing VMM 54.

FIG. 4 is a state diagram that schematically illustrates a state machine model 110 used by stateful firewall 32 in TCP connection tracking, in accordance with an embodiment of the invention. Transitions among the states depend on the type of the latest TCP packet received by the stateful firewall (for example, SYN, ACK, SYNACK, FIN, RST, or none) and the direction of the packet (from the connection originator to the target, or in reply from the target to the originator). Stateful firewall 32 updates the state of model 110 at each pass through step 100 (FIG. 3) depending upon the current state and the packet type and direction.

Model 110 includes the following TCP connection states:
A SYN received state 112, in which connection set-up has been initiated in response to an incoming or outgoing TCP SYN packet.
A connection established state 114, following acknowledgment of the TCP SYN packet. The connection remains in this state as long as proper message exchange is going on in the expected manner over the established connection.
A FIN received state 116, in which connection termination has been initiated in response to an incoming or outgoing TCP FIN packet.
A closure waiting state 118, following acknowledgment of the TCP FIN packet.
A connection termination state 120, when the termination handshake has been completed.
In all other cases—for initial connection set-up and final tear-down, connection reset (RST), and when a packet has been received that does not conform to the expected state transitions listed above—stateful firewall 32 passes the connection to a software handling state 122.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. Network interface apparatus, comprising:
a host interface for connection to a host processor and a host memory;
a network interface, which is configured to receive over a network incoming data packets destined for one or more local processes running on the host processor; and
packet processing circuitry, comprising hardware logic, which is coupled between the network interface and the host interface and is configured to access a list of active connections established between the local processes running on the host processor and corresponding processes on other computers on the network in accordance with a predefined transport protocol and to access context information, wherein the context information includes information with respect to a respective state of each of the active connections,
wherein the hardware logic is configured, upon receiving a packet from the network having a header identifying the packet as having been transmitted to a local process in accordance with the predefined transport protocol, to check the list to find a connection to which the packet belongs and upon finding the connection, to verify that the packet conforms to the respective state indicated by the context information for the connection and, if so, to update the context information and pass the packet to the local process,
wherein the hardware logic is configured, when the connection is not found on the list, to pass the packet to a privileged software process running on the host processor for handling by the privileged software process, and
wherein the packet processing circuitry is configured to send notifications to the privileged software process using a dedicated queue pair (QP), different from queue pairs used for interacting between the packet processing circuitry and the local processes.

2. The apparatus according to claim 1, wherein the hardware logic is configured, when the packet does not conform to the respective state of the connection to which the packet belongs, to identify the packet as invalid, wherein invalid packets are not passed to the local process.

3. The apparatus according to claim 2, wherein the hardware logic is configured to pass the invalid packet to a privileged software process running on the host processor for handling by the privileged software process.

4. The apparatus according to claim 1, wherein the predefined transport protocol comprises a Transmission Control Protocol (TCP).

5. The apparatus according to claim 4, wherein the context information comprises a state machine maintained for each of the active connections.

6. The apparatus according to claim 4, wherein the context information comprises a TCP connection window, wherein the hardware logic is configured to check that a sequence number of the packet falls within the TCP connection window and to update the TCP connection window responsively to the sequence number of the packet.

7. The apparatus according to claim 1, wherein when the local process is running on a virtual machine running over a virtual machine monitor on the host processor, the hardware logic is configured, upon verifying that the packet conforms to the respective state, to pass the packet to the local process on the virtual machine while bypassing the virtual machine monitor.

8. The apparatus according to claim 1, wherein the list of active connections is managed in the network interface apparatus.

9. The apparatus according to claim 1, wherein the packet processing circuitry is configured to access context information in the host memory.

10. The apparatus according to claim 9, wherein the privileged software process is configured to add a new entry in the list for the connection not found on the list, and a new entry of context information in the host memory for the connection, in response to the packet.

11. The apparatus according to claim 9, wherein the hardware logic is further configured to monitor outgoing data packets transmitted to the network by the local processes over the active connections and to update the context information in the host memory for the active connections responsively to the transmitted data packets.

12. The apparatus according to claim 9, wherein the packet processing circuitry is configured to cache portions of the context information from the host memory in a dedicated memory in the network interface apparatus.

13. A method for communication, comprising:
receiving over a network in a network interface controller (NIC) incoming data packets destined for one or more local processes running on a host processor that is coupled to the network by the NIC;
maintaining a list of active connections established via the NIC between the local processes running on the host processor and corresponding processes on other computers on the network in accordance with a predefined transport protocol;
maintaining context information with respect to a respective state of each of the active connections in a host memory;
upon receiving in the NIC a packet from the network having a header identifying the packet as having been transmitted to a local process in accordance with the predefined transport protocol, checking the list, by the NIC, to find a connection to which the packet belongs;
upon finding the connection, verifying in the NIC that the packet conforms to the respective state indicated by the context information in the host memory for the connection and, if so, updating the context information in the host memory and passing the packet to the local process; and
upon finding that the connection is not found on the list, passing the packet to a privileged software process running on the host processor for handling by the privileged software process,
wherein the NIC sends notifications to the privileged software process using a dedicated queue pair (QP), different from queue pairs used for interacting between the NIC and the local processes.

14. The method according to claim 13, and comprising, when the connection is not found on the list, passing the packet from the NIC to a privileged software process running on the host processor for handling by the privileged software process.

15. The method according to claim 14, wherein the privileged software process is configured to add a new entry in the list for the connection not found on the list, and a new entry of context information in the host memory for the connection, in response to the packet.

16. The method according to claim 13, and comprising, when the packet does not conform to the respective state of the connection to which the packet belongs, identifying the packet as invalid, wherein invalid packets are not passed to the local process.

17. The method according to claim 16, and comprising passing the invalid packet to a privileged software process running on the host processor for handling by the privileged software process.

18. The method according to claim 13, wherein maintaining the context information comprises monitoring, in the NIC, outgoing data packets transmitted to the network by the local processes over the active connections and updating the context information for the active connections responsively to the transmitted data packets.

19. The method according to claim 13, wherein the predefined transport protocol comprises a Transmission Control Protocol (TCP).

20. The method according to claim 19, wherein the context information comprises a state machine maintained for each of the active connections.

21. The method according to claim 19, wherein the context information comprises a TCP connection window, wherein verifying that the packet conforms to the respective state comprises checking that a sequence number of the packet falls within the TCP connection window and updating the TCP connection window responsively to the sequence number of the packet.

22. The method according to claim 13, wherein passing the packet to the local process comprises, when the local process is running on a virtual machine running over a virtual machine monitor on the host processor, passing the packet to the local process on the virtual machine while bypassing the virtual machine monitor upon verifying that the packet conforms to the respective state.

* * * * *